(12) United States Patent
Borrell

(10) Patent No.: US 11,013,252 B2
(45) Date of Patent: May 25, 2021

(54) PEELING MACHINE FOR PEELING NUTS

(71) Applicant: Jose Borrell S.A., Denia (ES)

(72) Inventor: Jose Vicente Roig Borrell, Denia (ES)

(73) Assignee: Jose Borrell S.A.

( * ) Notice: Subject to any disclaimer, the term of this patent is extended or adjusted under 35 U.S.C. 154(b) by 224 days.

(21) Appl. No.: 15/087,086

(22) Filed: Mar. 31, 2016

(65) Prior Publication Data
US 2016/0286848 A1 Oct. 6, 2016

(30) Foreign Application Priority Data
Apr. 1, 2015 (ES) .................. 201530381U

(51) Int. Cl.
*A23N 5/00* (2006.01)
(52) U.S. Cl.
CPC ............. *A23N 5/008* (2013.01); *A23N 5/002* (2013.01)
(58) Field of Classification Search
CPC .... A23N 5/002; A23N 5/008; A23N 5/00–08; A23N 15/08; B02B 3/04; B02B 3/045
USPC ......... 99/585, 616, 617, 618, 621, 623, 625, 99/624, 628
See application file for complete search history.

(56) References Cited

U.S. PATENT DOCUMENTS

| | | | |
|---|---|---|---|
| 59,324 A | 10/1866 | Wathew | |
| 2,433,730 A | 12/1947 | Bridge | |
| 3,602,280 A * | 8/1971 | Hill | A23N 7/02 99/484 |
| RE31,979 E | 9/1985 | Volk, Sr. | |
| 4,848,221 A | 7/1989 | Borba | |
| 5,542,525 A * | 8/1996 | Kornely | B65G 45/24 198/495 |
| 5,720,395 A * | 2/1998 | Schock | A23N 5/00 209/45 |
| 2008/0302708 A1* | 12/2008 | Kawakami | A23N 15/12 209/616 |
| 2009/0047403 A1* | 2/2009 | Lyon | A23N 1/02 426/483 |

FOREIGN PATENT DOCUMENTS

| | | | |
|---|---|---|---|
| CN | 203105569 U | 8/2013 | |
| CN | 203262232 U | 11/2013 | |
| EP | 0231877 A2 * | 8/1987 | ............. B01D 33/04 |
| EP | 2039257 A1 | 3/2009 | |
| ES | 2342651 A1 | 7/2010 | |
| WO | 2004043172 A1 | 5/2004 | |

OTHER PUBLICATIONS

English translation (machine) of EP0231877A2.*
Translation of ES 2342651 (Year: 2010).*

* cited by examiner

*Primary Examiner* — Erin E McGrath
(74) *Attorney, Agent, or Firm* — St. Onge Steward Johnston & Reens, LLC

(57) ABSTRACT

The present invention relates to the technical field of machines used for peeling nuts, such as almonds and the like which have been previously blanched, the machines having an accessible frame inside which there is a series of rollers arranged in pairs with nuts passing between them and each of them being associated with a rotating shaft, respectively, with movements at different speeds.

4 Claims, 3 Drawing Sheets

PEELING MACHINE FOR PEELING NUTS

FIELD OF THE INVENTION

The present invention relates to the technical field of machines used for peeling nuts, such as almonds and the like which have been previously blanched, said machines having an accessible frame inside which there is a series of rollers arranged in pairs with nuts passing between them and each of them being associated with a rotating shaft, respectively, with movements at different speeds.

BACKGROUND OF THE INVENTION

There are on the market today machines of this type which perform the tasks of peeling these nuts such as almonds and the like. These machines usually include pairs of vertically arranged rollers such that the nut passes between the rollers of each pair consecutively and the different rotational speed of the rollers of one and the same pair generates on the surface of the nuts a surface movement stripping away the skin thereof.

These machines achieve the objective of peeling nuts, which is the process whereby the tegument of the nut is detached from the grain. This tegument is the skin covering the nut and is normally brown in color like in almonds, peanuts and hazelnuts. In this peeling process, the temperature and the blanching time must be controlled since the nut has to be previously blanched with hot water to soften the skin and achieve better peeling.

These machines however have certain drawbacks. One of them consists of the difficulties existing in the tasks of cleaning and maintaining the inside of the machine.

Since the nuts must be blanched prior to the passage thereof between the rollers, they are wet when they reach the roller and although most of the skins that detached from them fall into the skin collection hoppers, a lot of them remain stuck to parts of the machine and to the rollers themselves, slowing down the operation thereof. For this reason, it is necessary to perform periodic cleaning tasks, and it is extremely important that these tasks can be carried out in a comfortable and simple manner.

Likewise, another drawback of this machine is due to the fact that continuous rubbing of the skins of the nuts against the rollers will gradually wear down the rollers and it is necessary to change them to maintain their effectiveness in the task of peeling these nuts.

When it is necessary to access the inside of the frame to perform these tasks, these tasks being either cleaning or replacement, if the rollers of the machines are secured by both ends of their shaft both to the front face and to the rear face of the frame, access to the inside must be made through one of the sides of the machine, which complicates access to all the parts of the machine. Furthermore, in order to change the rollers it is necessary to release the shafts at one of their ends, change the roller and reinstall all the components thereof.

Likewise, these machines have an additional problem because only one of the rollers of each pair can move laterally to modify the distance for the passage of the nut between both. This generates shifts in the central plane through which the nut falls, with a loss of efficiency and faults in peeling.

As a solution to these problems the same applicant is the owner of reference patent ES 2342651-A1 which describes a peeling machine for peeling almonds and the like in which each of the rolls or rollers of each pair is associated with a respective shaft suspended at one of its ends from a vertical panel dividing the inner space of the frame into two cavities, a front cavity and a rear cavity, said shafts projecting towards the front cavity and this frame being closed at the front portion by means of a large door allowing easy access to all the members of the machine.

Therefore, the movement to modify the distance for the passage of the nut between rollers is obtained by a symmetrical movement of both cylinders of each pair, the central plane through which the nut falls being kept constant.

Likewise, in this machine one of the ends of the shaft of each cylinder has been released, specifically the front end and the frame containing the cylinders has an access door on its front face. Therefore, all the elements inside the machine can be easily accessed through said front door for cleaning, repair or maintenance work in which the cylinders must be changed.

This improves these maintenance and cleaning tasks which become much easier and quicker to perform.

However, this machine has certain drawbacks which already existed in earlier machines and are not solved with this new machine. These consist of the fact that although the cleaning and replacement tasks are made easier, the rollers still experience very significant wear and at the same time also get dirty fairly quickly. Therefore, although the cleaning and maintenance processes are quicker and more comfortable, it is still necessary to perform them very often and every time this occurs, the machine must be shut down to clean or remove the cylinders, whereby the productivity of the machine decreases. Furthermore, in the case of roller replacement, there is an added drawback of the high roller weight, making the process even more difficult.

SUMMARY OF THE INVENTION

The peeling machine for peeling nuts, such as almonds and the like which have been previously blanched, described herein comprises a frame inside which there is a series of parallel main rollers arranged in pairs with a passage space for the passage of the nuts between them, and where each cylinder is associated with a rotating shaft, said rotating shafts being secured at only one end to a vertical inner panel.

This machine further comprises secondary rollers, each secondary roller being associated with one of the main rollers, respectively, located a certain distance from same and connected to said main roller by means of a closed band and means for tightening each band. Likewise, the secondary rollers corresponding to one and the same pair of main rollers are arranged symmetrically with respect to the intermediate vertical plane between the main rollers.

According to a preferred embodiment, the means for tightening each band are formed by a tensioning roller arranged outside the band the shaft of which is connected to a first end of an arm which is in turn secured at a second end opposite the first end to a rotating shaft fixed to the inner panel.

According to a preferred embodiment, the secondary rollers are fixed in position inside the frame.

According to a preferred embodiment, the secondary rollers have a diameter less than the diameter of the main rollers.

According to another aspect, in a preferred embodiment the peeling machine for peeling nuts comprises washing and drying means for washing and drying the bands. Said washing and drying means according to a preferred embodiment comprise washing and press drying.

These bands can be made of rubber, PVC or the like.

This peeling machine for peeling nuts preferably has an access door on the front face of the frame to make access to the elements inside the machine easier. To that end, the cylinders are secured at only one end to the vertical inner panel, at the end of the rotating shaft thereof opposite the front face of the frame.

The rotating shafts of the main cylinders of this machine preferably have drive means and rotate at different speeds, respectively, to enable peeling the nuts.

Likewise, in this peeling machine for peeling nuts, the main rollers of each pair are susceptible to relative joint movement with respect to an intermediate vertical plane between both. This allows regulating the passage space between the rollers, keeping the plane through which the nut falls constant.

With the peeling machine for peeling nuts proposed herein, a significant improvement of the state of the art is obtained.

This is because since the surface generating the peeling of the nuts is formed by a band instead of a cylinder, the surface area of the peeling element is increased and therefore the wear rate is reduced and the times before these peeling elements have to be replaced are lengthened.

Furthermore, since it is a band, most of the surface thereof is not in contact with any of the main and secondary cylinders and therefore the cleaning thereof is much easier and more effective.

Another significant advantage of these rollers with bands is that when wear occurs and there is an inevitable need to replace the bands with other new bands, in this case only each of the bands is replaced, not the entire roller. Therefore, when there is a need to replace a band, the band is loosened by means of moving the tensioning roller towards the outside through the arm rotating on its rotating shaft.

In this manner, with the band loosened, it is removed with ease from its location around the rollers. A new band is then placed in position around a main roller and the corresponding secondary roller and the band is again tightened by rotating the tensioning roller towards the band around the rotating shaft of the bar.

A peeling machine is therefore obtained which reduces shutdown times for cleaning and replacement tasks since these tasks are performed more efficiently and quickly and lengthens the periods in which these tasks are necessary, so it is an efficient, simple and easy machine which increases productivity.

BRIEF DESCRIPTION OF THE DRAWINGS

For the purpose of aiding to better understand the features of the invention according to a preferred practical embodiment thereof, a series of drawings is provided as an integral part of said description in which the following has been depicted with an illustrative and non-limiting character.

DETAILED DESCRIPTION OF THE INVENTION

Figure 1:
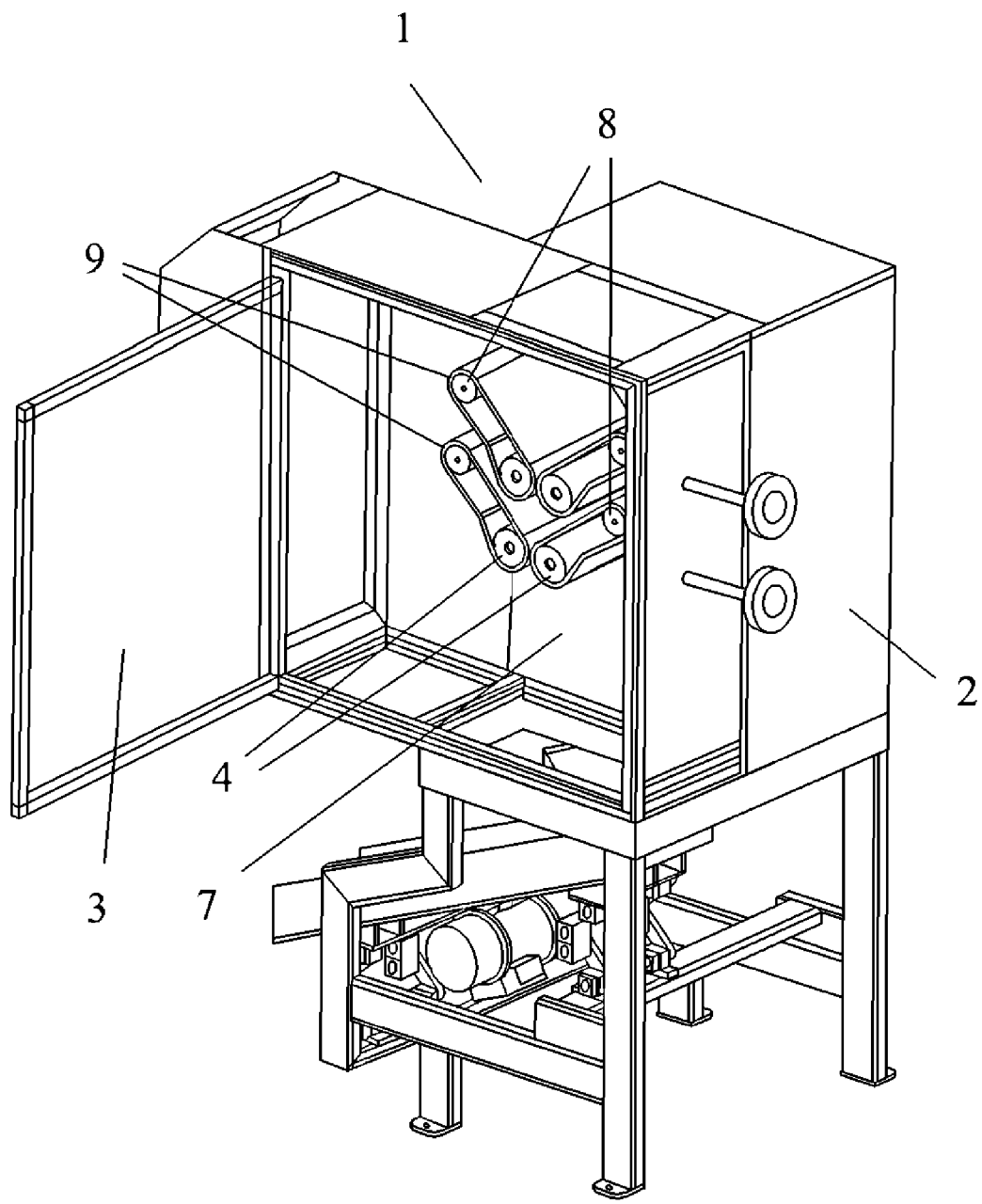
FIG. 1 shows a perspective view of the peeling machine for peeling nuts with the access door in the front face being open for a preferred embodiment of the invention.

In view of the drawings provided, it can be observed how in a preferred embodiment of the invention the peeling machine 1 for peeling nuts, such as almonds and the like which have been previously blanched, proposed herein comprises a frame 2 inside which there is a series of parallel main rollers 4 arranged in pairs with a passage space 5 for the passage of the nuts between them. Each main cylinder 4 is associated with a rotating shaft 6, these rotating shafts 6 being secured at only one end to a vertical inner panel 7.

Figure 2:
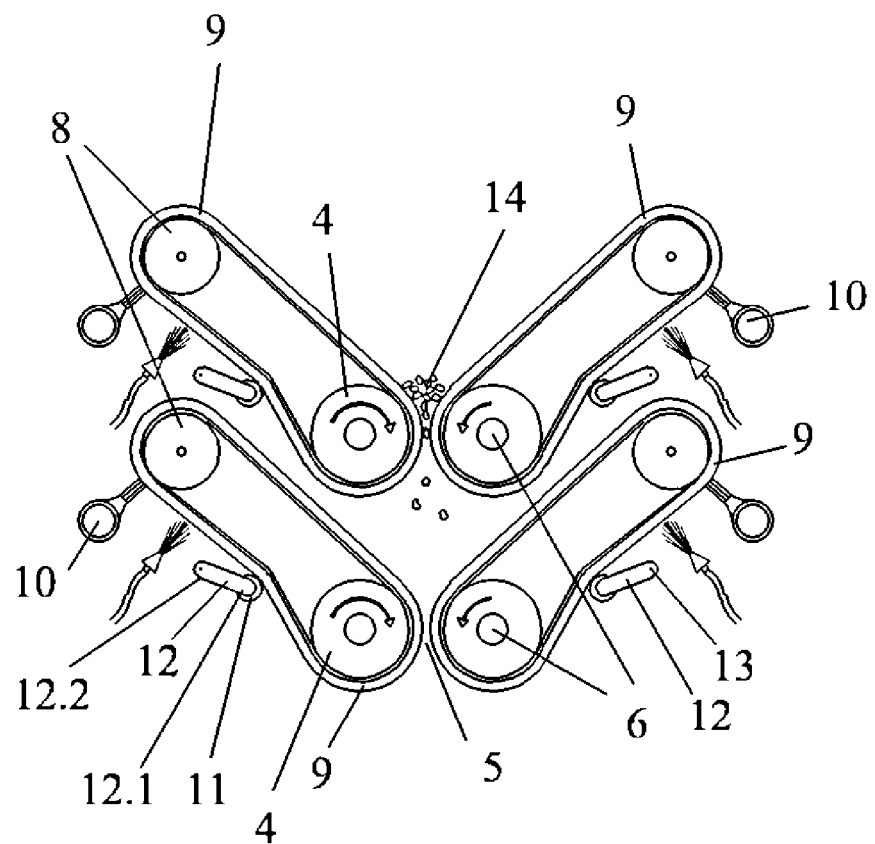
FIG. 2 shows an elevational view of the rollers with the bands of the peeling machine for a preferred embodiment of the invention.

As shown in FIGS. 1 and 2, this peeling machine 1 for peeling nuts further comprises secondary rollers 8, each of them associated with one of the main rollers 4, respectively. Each secondary roller 8 is located a certain distance from the associated main roller 4 and is connected thereto by means of a closed band 9. The secondary rollers 8 corresponding to one and the same pair of main rollers 4 are arranged symmetrically with respect to the intermediate vertical plane between said main rollers 4.

In this preferred embodiment of the invention as shown in FIG. 1, the peeling machine 1 for peeling nuts has an access door 3 on the front face of the frame 2. This allows complete access to the elements inside the machine, making the cleaning and maintenance tasks easier. This is possible because the main cylinders 4 and the secondary cylinders 8 are secured at only one end to the vertical inner panel 7, this end being the end opposite the front face of the frame 2.

Likewise, in this preferred embodiment of the invention the rotating shafts 6 of the main cylinders 4 of this machine preferably have drive means and rotate at different speeds, respectively, to enable peeling the nuts 14.

In this preferred embodiment of the invention, the means for tightening each band 9, as can be seen in FIG. 2, are formed by a tensioning roller 11 arranged outside the band. This tensioning roller 11 is connected through its shaft to a first end 12.1 of an arm 12 which is in turn secured at a second end 12.2 opposite the first end to a rotating shaft 13 fixed to the vertical inner panel 7.

Figure 4:
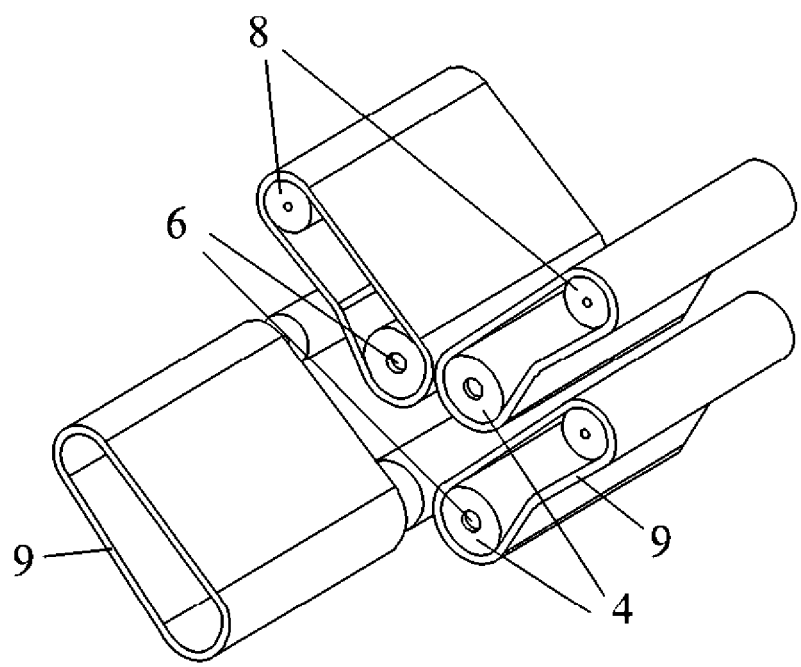
FIG. 4 shows a perspective view of the rollers with the bands of the peeling machine in a situation in which one of the bands has been removed, for a preferred embodiment of the invention.

These means for tightening apply suitable tension on the band so that it can peel the nut more efficiently and at the same time; when the means for tightening do not apply said tension on the band, said band can be easily removed from the rollers on which it acts, as shown in FIG. 4.

Figure 3:
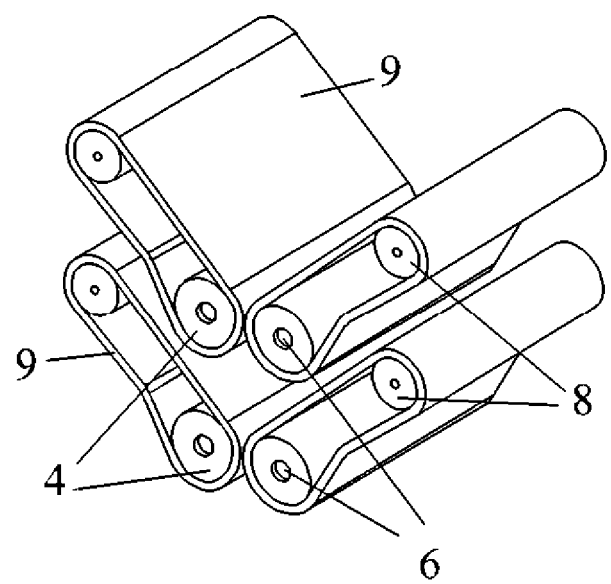
FIG. 3 shows a perspective view of the rollers with the bands of the peeling machine for a preferred embodiment of the invention.

As shown in FIGS. 2 to 4, in this preferred embodiment of the invention the secondary rollers 8 have a diameter less than the diameter of the main rollers 4 and are fixed in position inside the frame 2.

Likewise, in this preferred embodiment of the invention the peeling machine 1 also comprises means for tightening each band 9 and washing and drying means 10 for washing and drying same, which in this embodiment are formed by washing and press drying.

The bands 9 used in this preferred embodiment of the invention are made of rubber, although they could be made of PVC or any other material with similar hardness characteristics.

In this preferred embodiment of the invention, the main rollers 4 of each pair are susceptible to relative joint movement with respect to an intermediate vertical plane between both. This allows regulating the passage space between the rollers, keeping the plane through which the nut falls constant, increasing peeling efficiency.

With the peeling machine for peeling nuts proposed herein, significant improvements with respect to the state of the art are achieved from both the productivity and efficiency viewpoints.

Therefore, by using bands for peeling the nuts instead of rollers, the length of the contact surface of these bands is greater than the length of the contact circumference of the rollers, so it will take a longer time for the bands to be worn down and therefore, with less wear, the times in which there is a need for replacement is prolonged, and with it there will be less machine shutdown times and higher production.

Likewise, by using bands, when the wear conditions make replacing the bands necessary, the band is changed but not the roller, so it is overall simpler and more comfortable and there is no need to handle the rollers, which are considerably heavy.

All this favors shorter times for replacement tasks, so the machine remains shut down for less time and can operate again in a shorter period of time, obtaining a higher productivity.

The separation between the main and secondary cylinders offers spaces in which the band is free of contact with any of the two cylinders and this makes gripping the bands, once they are loosened at the time of removal for replacement, easier.

An efficient, easy and practical machine with a higher productivity is therefore achieved.

What is claimed is:

1. A blanched nuts peeling machine comprising:
   a frame inside which there is at least one pair of parallel main rollers with a passage space for passage of blanched nuts between the at least one pair of parallel main rollers, wherein each main roller is associated with a rotating shaft secured in a cantilever arrangement to a vertical inner panel and the rotating shafts of the at least one pair of parallel main rollers rotate at different speeds, in use, to enable peeling the blanched nuts;
   a plurality of secondary rollers, each secondary roller being associated with one of the main rollers, respectively, located at a distance from the associated one of the main rollers and connected to the associated one of the main rollers by a closed rubber band;
   the secondary rollers associated with the at least one pair of main rollers are arranged symmetrically with respect to an intermediate vertical plane between the main rollers;
   a plurality of tighteners for tightening the closed rubber bands; and
   a door secured to the frame opposite the vertical inner panel, the door being operable between a closed position and an open position, wherein when the door is in the closed position, the door and frame form a closed cabinet and when the door is in the open position, a user can access the inside of the frame;
   wherein the secondary rollers have a diameter less than a diameter of the main rollers and wherein each secondary roller is secured only at one end to the vertical inner panel so that each of the closed rubber bands is, upon opening the door, removable from its associated secondary roller and main roller by moving away from the vertical inner panel and without releasing either end of the associated secondary or main roller from the vertical inner panel.

2. The blanched nuts peeling machine according to claim 1, wherein each tightener is formed, respectively, by a tensioning roller arranged outside the closed rubber band, the tensioning roller having a shaft connected to a first end of an arm, which is in turn secured at a second end opposite the first end to a rotating rod fixed to the vertical inner panel.

3. The blanched nuts peeling machine according to claim 1, wherein the secondary rollers are fixed in position inside the frame.

4. The blanched nuts peeling machine according to claim 1, wherein the at least one pair of parallel main rollers comprises a first pair of main rollers and a second pair of main rollers, the first pair of main rollers is located above the second pair of main rollers such that the passage space for the passage of nuts between the first pair of main rollers and the second pair of main rollers is aligned with the intermediate vertical plane.

* * * * *